US010031842B2

(12) United States Patent
Ioualalen et al.

(10) Patent No.: US 10,031,842 B2
(45) Date of Patent: Jul. 24, 2018

(54) METHOD FOR ADJUSTING THE PRECISION OF A COMPUTER PROGRAM MANIPULATING AT LEAST ONE NUMBER WITH A DECIMAL POINT

(71) Applicant: NUMALIS, Montpellier Cedex (FR)

(72) Inventors: Arnault Ioualalen, Montpellier (FR); Nicolas Normand, Montpellier (FR); Matthieu Martel, Argelès (FR)

(73) Assignee: NUMALIS, Montpellier Cedex 2 (FR)

( * ) Notice: Subject to any disclaimer, the term of this patent is extended or adjusted under 35 U.S.C. 154(b) by 0 days.

(21) Appl. No.: 14/645,595

(22) Filed: Mar. 12, 2015

(65) Prior Publication Data
US 2016/0170866 A1 Jun. 16, 2016

(30) Foreign Application Priority Data
Dec. 10, 2014 (FR) ...................................... 14 62209

(51) Int. Cl.
*G06F 9/44* (2018.01)
*G06F 11/36* (2006.01)
*G06F 8/40* (2018.01)
*G06F 8/30* (2018.01)
*G06F 8/70* (2018.01)

(52) U.S. Cl.
CPC ............ *G06F 11/3688* (2013.01); *G06F 8/30* (2013.01); *G06F 8/40* (2013.01); *G06F 8/70* (2013.01)

(58) Field of Classification Search
CPC .................. G06F 8/30; G06F 8/40; G06F 8/70
See application file for complete search history.

(56) References Cited

U.S. PATENT DOCUMENTS

| 9,075,630 | B1* | 7/2015 | Smith | G06F 8/443 |
| 9,436,442 | B1* | 9/2016 | Kintali | H03M 7/24 |
| 2005/0065990 | A1* | 3/2005 | Allen | G06F 9/45504 708/495 |
| 2006/0101425 | A1* | 5/2006 | Donovan | G06F 8/443 717/136 |
| 2008/0244241 | A1* | 10/2008 | Barraclough | G06F 8/52 712/222 |
| 2011/0191755 | A1* | 8/2011 | Guenthner | G06F 8/4441 717/140 |
| 2012/0311550 | A1* | 12/2012 | Kawahito | G06F 8/4441 717/151 |

* cited by examiner

*Primary Examiner* — Duy Khuong T Nguyen
(74) *Attorney, Agent, or Firm* — Greer, Burns & Crain, Ltd.

(57) ABSTRACT

A method including measuring an initial precision measurement of at least one value of a number with a decimal point, measuring an infinite precision measurement of a value of the number with a decimal point, where a format of the number with a decimal point or of a primitive operation manipulating a number with a decimal point is first replaced with a predetermined optimal format. Additionally, manipulating, for at least one instruction, at least one number with a decimal point, including writing at least one variant performing the same function as the at least one instruction, and measuring, for each variant, at least one value of the at least one number with a decimal point obtained with the variant, and selecting the optimal variant as a function of the measured value and the initial precision and infinite precision values and replacing the at least one instruction with the selected variant.

14 Claims, 5 Drawing Sheets

```
function void main() {
    var table = [4097.0, 4099.0, 4101.0, 4103.0, 4105.0] ;
    var float value, result ;
    for (int i = 0 ; i < 5 ; i++)
    {
        value = table[i] ;
        result = polynome (value) ;
        display (result) ;
    }
}
function float polynome(float v){
    var float calcul ;
    calcul = v × v ;           // calculates polynomial x²
    calcul = calcul + v ;      // calculates polynomial x²+x
    return calcul ;
}
```

```
function float polynome(float v){
    strore( v ) ;
    var float calcul ;
    calcul = v × v ;           // calculates polynomial x²
    store( calcul ) ;
    calcul = calcul + v ;      // calculates polynomial x²+x
    store( calcul ) ;
    return calcul ;
}
```

```
function void main() {
    var table = [4097.0, 4099.0, 4101.0, 4103.0, 4105.0] ;
    var extend value, result ;
    for (int i = 0 ; i <5 ; i++)
    {
        value = extend ( table[i] ) ;
        resul = polynome(value) ;
        display (result) ;
    }
}
function extend polynome(extend v){
    store( v ) ;
    var extend calcul ;
    calcul = mult(v, v) ;
    store( calcul ) ;
    calcul = add( calcul, v) ;
    store( calcul ) ;
    return calcul ;
}
```

| | 4097.0 | 4099.0 | 4101.0 | 4103.0 | 4105.0 |
|---|---|---|---|---|---|
| Initial | 16789504 | 16805900 | 16822300 | 16838712 | 16855128 |
| Ideal/Infinite | 16789506 | 16805900 | 16822302 | 16838712 | 16855130 |
| Difference | -2 | 0 | -2 | 0 | -2 |
FIG. 2d 206
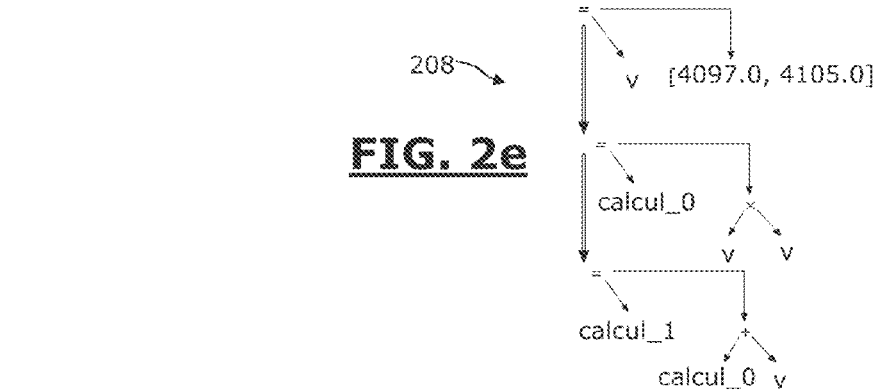
FIG. 2e 208
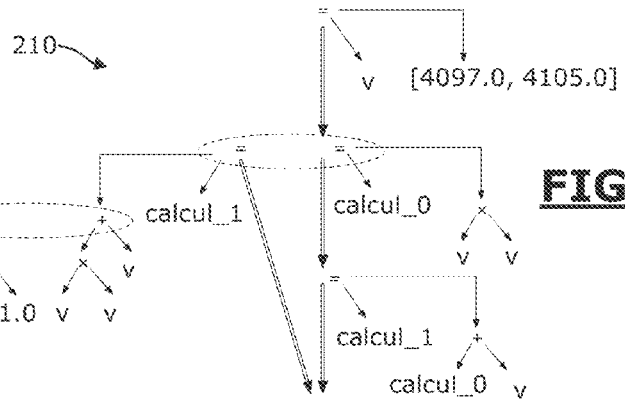
210
FIG. 2f
```
function float polynome(float v){
    var float calcul ;
    calcul = v × (v + 1.0) ;   // calculates polynomial x(x+1)
    return calcul ;
}
```
FIG. 2g
212

METHOD FOR ADJUSTING THE PRECISION OF A COMPUTER PROGRAM MANIPULATING AT LEAST ONE NUMBER WITH A DECIMAL POINT

BACKGROUND

The invention relates to a method for adjusting the accuracy of a computer program manipulating at least one number with a decimal point, and in particular for improving the accuracy of such a program. It also relates to a computer program and a system implementing such a method.

The field of the invention is the field of the calculation accuracy of computer programs manipulating numbers with a decimal point.

By accuracy is meant the (absolute or relative) deviation, or value, between the "theoretical" result of a mathematical calculation obtained from the field of real numbers and the "actual" result of this same calculation when it is carried out by a machine which uses fixed-point or floating-point arithmetic.

The accuracy comprises, on the one hand, errors caused by the computational representation chosen by the author of the computer program for the numbers and, on the other hand, those introduced by the instructions manipulating these numbers. In every case it is difficult, or even impossible, for an author to measure and adjust the accuracy of a computer program manipulating numbers with a decimal point manually.

On the one hand, it is very difficult to measure the accuracy of a computer program when it will be executed by a machine, because the arithmetics used cause accuracy problems which cannot be anticipated easily by a human. A long task of manual analysis and tests is necessary to evaluate the accuracy of a calculation.

On the other hand, the improvement or optimization of the accuracy is in principle combinatorial. In fact, there is an exponential (or even infinite) number of possible ways of writing one and the same calculation (or, in other words, mathematically equivalent formulae, by associativity, distributivity, etc.). Each way of writing a formula can have a different degree of accuracy from the others.

Currently, there is no automated method that makes it possible to take into account the errors caused in a computer program manipulating a number with a decimal point and to adjust or optimize the accuracy of this computer program.

SUMMARY

The aim of the invention is to overcome these drawbacks.

One aim of the present invention is to propose a method for adjusting, in an automated manner, the accuracy of a computer program manipulating at least one number with a decimal point.

Another aim of the invention is to propose a method that makes it possible to customize the accuracy that it is desired to obtain during the execution of a computer program manipulating at least one number with a decimal point.

A further aim of the invention is to propose a method that makes it possible to improve the accuracy of a computer program manipulating at least one number with a decimal point, for given execution resources, and/or a given execution time.

Also, another aim of the invention is to propose a method that makes it possible to reduce, for a given accuracy, the resources necessary for execution and/or the execution time of a computer program manipulating at least one number with a decimal point.

The invention makes it possible to achieve at least one of the abovementioned aims by a method for adjusting the accuracy provided by a computer program, said the source program, manipulating at least one number with a decimal point, said method comprising the following steps:
- measurement, said initial accuracy measurement, of at least one value of at least one number with a decimal point in said source program;
- measurement, said infinite accuracy measurement, of at least one value of said number with a decimal point in said source program, in which a format of at least one number with a decimal point, in particular of all the numbers with a decimal point, and/or of a primitive operation manipulating a number with a decimal point, in particular of all the operations manipulating numbers with a decimal point, is first replaced with a predetermined more precise format, said optimal format;
- for at least one instruction manipulating, in said source program, at least one number with a decimal point, a step, said optimization step, comprising the following steps:
  - writing at least one variant performing the same function as said at least one instruction;
  - for each variant, measuring at least one value of said number with a decimal point obtained with said variant; and
  - selecting at least one variant, said optimal variant, as a function of said measured value and said initial accuracy and infinite accuracy values; and
- modification of said source program by replacing said instruction with said selected variant.

Thus, the method according to the invention makes it possible to improve, or even optimize, the accuracy obtained with a computer program by identifying a specific way of coding this computer program, and more particularly by identifying a particular combination of coding variants for different instructions manipulating numbers with a decimal point in the computer program.

An optimized computer program obtained using the method according to the invention does not necessarily consume more execution resources, and does not necessarily require a longer execution time, compared with the source program, while proposing more accurate results than those obtained with the source program. In fact, in the optimized computer program, obtained thanks to the method according to the invention, the type of data manipulated, and the type and nature of the functions remain identical to those used in the source program. As a result, the time and resources needed for the execution of the optimized program are similar to the time and resources needed to execute the source program.

What is more, the method according to the invention makes it possible to reduce the resources and the time needed for the execution of the computer program for a given accuracy. In fact, it is possible, for a given accuracy, to select the variant(s) which require(s) a shorter execution time and/or smaller execution resources, such that the execution time of the optimized program is reduced or the resources needed for the execution of the optimized program are smaller.

In the present application, the terms "initial" and "optimal" are names used solely to prevent the writing from being clumsy. Thus, the term "optimal" does not necessarily mean the best variant or the best format.

According to the invention a primitive format/type can be one of the formats defined by the standard IEEE754 (for example "float" or "double") or any other type defined by the user internally based partially or completely on one of the formats of the standard IEEE754, or based on a customized number with a decimal point format (for example within the framework of the fixed-point arithmetic).

According to the invention an optimal format can be the MPFR format (originating from the GNU MPFR library) having a greater precision in the representation of the numbers with a decimal point and of the operations processing these numbers. Thus, the format of a number with a decimal point, for example the "float x=0.1;" format in C language, can be replaced with the corresponding MPFR format, for example "mpfr_t x=new mpfr_t (0.1, PRECISION);", where "PRECISION" is an integer value much greater than the size of the initial "float" format. Moreover, a primitive operation, for example the addition operation "+", can be replaced with the operation performing the same function in the MPFR library, for example mpfr_add( ).

To do this, a library can be defined such that each primitive format is associated with an optimal format. Thus, as soon as a primitive format is detected in the source program for a number with a decimal point or an operation, the corresponding optimal format is simply read in said library.

According to a variant which is in no way limitative, the initial accuracy measurement step and/or the infinite accuracy measurement step for a value of a number can comprise adding into the program at least one instruction, said instrumentation instruction, providing said value.

Advantageously, the method according to the invention can also comprise a step of syntactic analysis, or "parsing", of the source program.

Such a parsing makes it possible to provide a representation, said intermediate representation, of said source program, independently of the language which was used to code the source program. The intermediate representation can for example be in XML.

In this case, at least one, in particular each, of the steps of the method according to the invention can be carried out as a function of said intermediate representation, and more particularly on the basis of said intermediate representation.

For example, at least one step of measuring at least one value of at least one number with a decimal point, in initial accuracy or in infinite accuracy is carried out on the basis of said intermediate representation. In fact, the intermediate representation can be analysed to detect at least one instruction manipulating at least one number with a decimal point in the source program. As a function of the position of this instruction in the source program, a new instruction is added into the source program at the level of or just after said instruction in order to capture the value of said at least one number with a decimal point, and to display and/or store said captured value.

Similarly, the replacement of a primitive format, of a number with a decimal point or of an operation, in the source program can be carried out on the basis of the intermediate representation provided by the parsing. For example, at least one primitive format, of a number with a decimal point or an operation, and its position, and in particular its checkpoint, in the source program can be determined by analysing the intermediate representation of the source program. Having determined the primitive format and its position, and more particularly the checkpoint associated with said primitive format, in the source program, the latter can be modified to replace the primitive format with the optimal format.

The position of a primitive format returned by the parser can correspond to the checkpoint associated with said format, optionally enhanced by at least one item of formatting data, which can comprise an item of indentation data, an item of text formatting data used during the coding of the source program, etc.

What is more, the method according to the invention can also comprise, before the step of writing at least one variant, a representation, said unified representation, of the source program in one language, said unified language, irrespective of the language used for the source program.

Thus, the optimization step can be carried out on the source program in said unified language.

Such a unified language makes it possible to represent any source program whatever in any programming language whatever in a single and unique language in which it is then easy to identify one or some variants for one instruction or a set of instructions.

More particularly, the representation of the source program in a unified language can take as the input the source program itself, or an intermediate representation provided by a parsing of the source program.

According to a first embodiment, at least one variant of at least one instruction, or of a group of instructions, can be previously stored in a database. In this case, when said instruction (or said group of instructions) is detected, it is sufficient to read, in said database, the variant(s) associated with this instruction (or this group of instructions).

Alternatively or in addition, according to a second embodiment, at least one instruction, or a group of instructions, is associated with one or more algorithms for generating variants. Thus, when said instruction, or said group of instructions, is detected, said associated algorithm(s) is/are executed to generate one or more variants for said instruction or said group of instructions. To do this, a database can store, for one or some operation(s) (or one or some combination(s) of operations) that can be detected in the source program, for example on the basis of its unified representation, one or several algorithms for generating variant(s) associated with these operations (or combination of operations). Thus, when an operation (or combination of operations) is detected, the database is read to determine the algorithm for generating a variant. This algorithm is then executed to generate the variants for this operation (combination of operations). According to an example, when a combination comprising "+" and "x" operations is detected, a predetermined factorization or distributivity algorithm is called as a function of the position and the number of these operations and of the operands involved.

Advantageously, for at least one instruction, the step of modification of the source program can comprise the following steps:

identifying the instruction in the source program, for example as a function of a representation in a unified language of said source program and optionally as a function of an intermediate representation provided by a parsing of the source program, coding the optimal variant of said instruction in the language of the source program, and replacing said instruction with its optimal variant in the source program.

In order to carry out the replacement of said instruction with its optimal variant, the location of the instruction is identified in the source program, for example using the intermediate representation or the unified representation, taking good care to identify the start and the end of the instruction. Then the original instruction is erased and replaced with its optimal variant.

According to a particularly advantageous feature, at least one variant of at least one instruction manipulating at least one number with a decimal point can be written as a function of at least one infinite accuracy value of said number, previously measured during the infinite accuracy measurement step.

In fact, it can be the case that a variant of an instruction giving the most accurate results is the one the structure of which is adapted to the values that the number with a decimal point(s) manipulated by this instruction can adopt.

Such a situation is particularly true when an instruction manipulates a number with a decimal point capable of adopting different values, such as a range of values.

According to a non-limitative embodiment, an instruction can manipulate a variable x the values of which are comprised in the range of values [1-100000], with 99% of the values comprised in the sub-range [1-2], the optimal variant of such an instruction can in reality comprise a set of two instructions, a first instruction processing the sub-range [1-2] and a second instruction processing the sub-range [2-100000].

Thus, the method according to the invention makes it possible to take into account one or some infinite accuracy value(s) of a number with a decimal point manipulated by an instruction with a view to determining the optimal variant of this instruction.

The selection of an optimal variant can also be carried out as a function of at least one parameter previously determined, in particular a parameter relating to an execution time of the program and/or a parameter relating to a resource needed for the execution of said program, etc.

Such a parameter relating to an execution time of the program and/or to a resource needed for the execution of said program can be a parameter concerning the parallelism of the source program, the format of the numbers with a decimal point in fixed-point arithmetic, or also the format of a number with a decimal point in at least a part of the source program.

In this case, the method according to the invention can also comprise a measurement, for each variant of an instruction, of the value of said parameter for said variant, for example:
of a total execution time of said variant or resources needed for the execution of said variant;
a number of cycles (estimated or actual) for executing a variant;
a number of instructions executed per cycle ("IPC");
an instruction-level parallelism ("ILP");
the number of occurrences of one or more operations; and/or
etc.

Advantageously, the measurement and adjustment of the accuracy can relate to the value itself of a variable.

Alternatively, or in addition, the measurement and adjustment of the accuracy can relate to a criterion calculated on the basis of said value of the variable or of a group of variables, or the development of said value of one or more variables throughout the program, namely:
a typical deviation of said value in relation to the one measured in infinite accuracy;
a maximum deviation between said values of one and the same variable in relation to those measured in infinite accuracy throughout an execution;
the sum (in absolute value or not) of the successive deviations between said values of one or more variables in relation to those measured in infinite accuracy throughout the program;
the evolution of the successive deviations between said values of one or more variables in relation to those measured in infinite accuracy throughout the program. This evolution can be characterized, for example, by the calculation of a derivative, of a linear or polynomial interpolation, of a regression; and/or
etc.

Advantageously, and in no way limitatively, at least one instruction for which at least one variant is written during the writing step can comprise:
a mathematical operation, or a relationship comprising several mathematical operations, implemented in the source program, and/or
a functional block formed by several instructions,
a conditional block formed by several instructions;
an iterative block formed by several instructions;
a function call,
a definition of a variable or of a function,
etc.

According to a first variant, for each variant of each instruction the method according to the invention can comprise generating a variant of the source program in its entirety.

Alternatively, according to a second preferred variant, the writing step can comprise enhancing the program with one or more variants of one or more instructions, in particular in a unified or intermediate representation of said program.

Thus, the program can be statically executed and/or analysed, as it progresses, with all the possible combinations with a view to determining the variants that make a greater accuracy of the program, as a whole and not solely for only a part of the program.

More particularly, the step of measuring the value of a number obtained with a variant of an instruction can comprise the following operations:
running through the program with said variant, optionally combined with each of the variants of at least one other instruction, in particular of each of the other instructions; and
propagating the error obtained with said variant, as the program progresses, for each combination, in particular the error is propagated in an optimal format such as for example the MPFR format.

Thus, for a given instruction, it is possible to measure the accuracy provided by said variant combined with at least one, in particular each, variant of at least one other instruction, in particular of each of the other instructions of said program for which variants are determined.

Take the non-limitative case of a source program comprising five instructions, or groups of instructions, namely the instructions (A, B, C, D, E) for which there is at least one variant, for example (($A_1$, $A_2$), ($B_1$, $B_2$, $B_3$), ($C_1$, $C_2$, $C_3$, $C_4$), ($D_1$, $D_2$), ($E_1$, ..., $E_n$)). To determine the optimal variant of "C", each of the variants ($C_1$, $C_2$, $C_3$, $C_4$) is tested combined with each of the variants of the other instructions, in order to determine the variant of "C" which makes it possible to obtain the best accuracy, or more generally the desired accuracy, using all of the source program.

Advantageously, for the measurement of at least one value of at least one number with a decimal point during the optimization step, for at least one combination the propagation of the error can be carried out using the optimal format, for example the MPFR format.

Thus, it is possible to determine the accuracy actually obtained by the variant of an instruction, independently of the accuracy associated with representation used in the source program.

According to an embodiment which is in no way limitative, and as described above:
  the optimal format for at least one variable can be the MPFR format or the rational number format, such that at least one variable with the primitive format is redefined with the MPFR format or with the format of a rational number; and/or
  the optimal format for an operation can be the MPFR format, such that at least one mathematical operation with the primitive format is redefined by a function call with the MPFR format.

The step of modification of the source program provides a program known as optimized.

The method according to the invention can also comprise a step of verification of the optimization, comprising the following steps:
  initial accuracy measurement of at least one value of at least one number with a decimal point in said optimized source program; and
  comparison of said measured value with a value of said number with a decimal point measured in initial accuracy for the source program.

According to another aspect of the present invention, a computer program is proposed comprising instructions for implementing all the steps of the method according to the invention, when said program is executed by an electronic/computer device.

Such a computer program can be written in any programming language, and in particular in C, C++, JAVA, Fortran, Pascal, ADA, COBOL, etc.

According to yet another aspect of the present invention, a system is proposed comprising:
  a computer program, and/or
  means configured to implement all the steps of the method according to the invention.

Such a system can comprise or consist of one or more computers equipped with instructions that can be executed by one or more processors for implementing all the steps of the method according to the invention.

Such a system can be any electronic and/or computer hardware capable of executing computer instructions. Such a system can also amount to a processor or an electronic chip configured via the hardware and/or with computer instructions for implementing each of the steps of the method according to the invention.

Such a system can, in a practical version, be implemented on or correspond to a computer.

BRIEF DESCRIPTION OF THE DRAWINGS

Other advantages and features will become apparent on examination of the detailed description of examples that are in no way limitative and of the attached drawings, in which:

FIGS. 2a-2g are diagrammatic representations of the results provided by the method of FIG. 1 on a non-limitative example of a source program;

DETAILED DESCRIPTION

It is well understood that the embodiments that will be described hereinafter are in no way limitative. Variants of the invention can in particular be envisaged comprising only a selection of the features described below in isolation from the other described features, if this selection of features is sufficient to confer a technical advantage or to differentiate the invention with respect to the state of the prior art. This selection comprises at least one preferably functional feature without structural details, or with only a part of the structural details if this part alone is sufficient to confer a technical advantage or to differentiate the invention with respect to the state of the prior art.

In particular, all the described variants and embodiments can be combined if there is no objection to this combination from a technical point of view.

In the figures, the elements common to several figures retain the same references.

Figure 1:
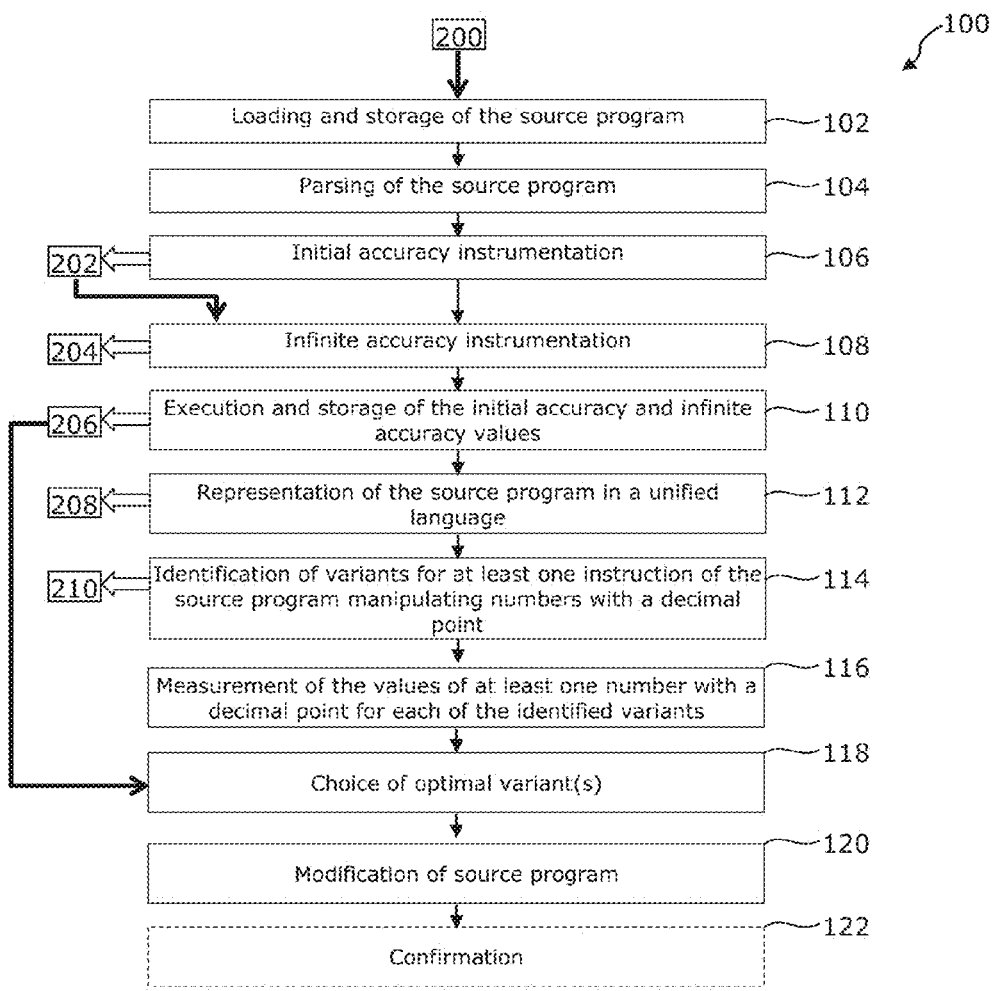
FIG. 1 is a diagrammatic representation in the form of a diagram of the steps of a first non-limitative example of a method according to the invention.

FIG. 1 is a diagrammatic representation in the form of a diagram of the steps of a first non-limitative example of a method according to the invention.

FIGS. 2a-2g are diagrammatic representations of the results provided by the different steps of the method 100 of FIG. 1, on a non-limitative example of a source program.

The method 100 shown in FIG. 1 comprises a step 102 loading the source program. The loaded source program can be a source code, i.e. in the language used to code it, or in the form of an executable, i.e. in the language used in order to be executed in a computer or a machine capable of executing a program in machine language, such as an automaton for example. During this step 102, the source program is copied to obtain two copies, one copy of the source program is stored and the other copy is used to carry out the subsequent steps.

A non-limitative example of a source program 200 loaded during step 102 is given in FIG. 2a. This source program is coded in C++. The example given in FIG. 2a comprises a function called polynôme which has the overall function of evaluating the polynomial "$x^2+x$" over a series of points comprised between 4097 and 4105.

At a step 104, a parsing of the source program is carried out by a parser. This step 104 provides an intermediate representation of the source program, for example in XML. This intermediate representation comprises:
  each event in the source program manipulating at least one number with a decimal point,
  for each event, the location and in particular the checkpoint, optionally enhanced as described above, in the source program of the instruction, or of the block/group of instructions, carrying out this event.

Each event can be a mathematical operation, a computer function, a conditional loop, etc.

As a function of the intermediate representation, a step 106 adds into a copy of the source program one or some instruction(s), said output instructions, for measuring the value of one or more numbers with a decimal point in the program. In other words, this step 106 carries out an initial accuracy instrumentation of the source program by adding into the source program instrumentation instructions which have the aim of providing the value or values of one or more numbers with a decimal point manipulated in the source program. This step 106 provides a version of the source program instrumented in initial accuracy.

An example instrumented in initial accuracy 202 of the source program 200 of FIG. 2a is given in FIG. 2b. It is noted that this example instrumented in initial precision comprises, several times, the instrumentation instruction sauvegarder( ) which makes it possible to store the value of a number with a decimal point manipulated in the function polynome( ).

A step 108, which is carried out after step 106, carries out an instrumentation of the source program in infinite accuracy. To do this, this step 108 takes as the input a copy of the version instrumented in initial accuracy 202 provided in step 106. In this copy of the version instrumented in initial accuracy 202, step 108 replaces:
- each primitive format with a format of greater precision than the primitive format, such as for example with an MPFR format. For example, when the source program is coded in C++, a primitive format such as "double", "float", "double double" is replaced with the MPFR equivalents;
- each primitive operation with an operation of greater precision than the primitive operation, such as for example with an MPFR operation. For example, when the source program is coded in C++, a primitive operation such as addition, i.e. "+", is replaced with the operation mpfr_add( ).

A version instrumented in infinite accuracy 204 of the source program 200 of FIG. 2a is given in FIG. 2c. It is noted that, in the function "polynome( )", the format of the variable "v" has been changed from "float" to "extend" and the format of the variable "calcul" has been changed from "float" to "extend". Moreover, the primitive addition operation "+" has been replaced with a function call "add" of higher precision, and the primitive multiplication operation "×" has been replaced with a function call "mult" of higher precision.

Then, a step 110 executes the version instrumented in initial accuracy 202 and the infinite accuracy version of the source program. The values of the variable "calcul" obtained with each of these versions are stored. FIG. 2d gives, in a table 206, the values of the variable "calcul" obtained in initial accuracy and in infinite or ideal accuracy. The difference between the two values is also indicated for each starting value.

Then, during a step 112, the method carries out a representation in a unified language of the source program 200, and in particular of the function "polynome( )" of the program 200 which manipulates numbers with a decimal point. To do this, step 112 takes as the input the intermediate representation provided by step 104 and provides the unified representation by means of a computer program dedicated to the parser used during step 104. Such a unified representation can be carried out in a known language or in a proprietary language specifically defined for step 112.

A version 208 in a unified language of the source program 200 of FIG. 2a, and in particular of the function "polynome( )" of this source program 200 manipulating the numbers with a decimal point, is given in FIG. 2e. The unified language in this example is a proprietary language in which the double-lined arrows represent the sequence of the instructions and the single-lined arrows represent the parse tree, but also the tree for evaluating the instruction.

Then, during a step 114, once the representation in the unified language has been constructed, different syntactic conversion algorithms are applied to the program in the unified language, in order to provide a program enhanced with variants for one or more instructions manipulating numbers with a decimal point, such as for example distributivity, factorization, iterative block unfolding algorithms, etc. This step 114 provides a source program enhanced in the unified language.

An enhanced version in the unified language 210 of the program 208 of FIG. 2e is given in FIG. 2f. The algorithms applied during step 114 result in the formation of equivalence classes represented by dotted ovals in FIG. 2f, which contain new ways of writing this program. Among other things, these algorithms can result in the formation of an expression where calcul_0 is substituted with its definition in the formulation of calcul_1. Subsequently, other transformation algorithms will identify that the expression "v+(v×v)" can be transformed using the real arithmetic factorization rule. For example, the expression "v+(v×v)" can be transformed into "v×(v+1.0)".

During a step 116, for each instruction, and for each of the variants identified during step 114 for this instruction, the values of the number with a decimal point or numbers provided by this variant combined with each of the variants of the other instructions are measured, by static analysis or by dynamic analysis. This measurement consists, for example, of instrumenting the enhanced source program in the unified language obtained in step 114 with a view to providing the values of the number with a decimal point or numbers, for example in an identical or similar manner to that described with reference to step 106. During this step, the error is, preferably, propagated using the optimal format, for example the MPFR format.

Once the values have been measured during step 116, for each of the variants these values are compared during a step 118 with those obtained in initial accuracy and in infinite accuracy, during step 110. This comparison makes it possible to determine/choose the variant which provides the best accuracy, or the smallest error. In the example shown in FIG. 2f, it is the variant "calcul_1=v×(v+1.0)" which provides the best accuracy, i.e. the value which is closest to that obtained in infinite accuracy.

During a step 120, the source program is modified such that at least one instruction manipulating a number with a decimal point is replaced with its optimal variant identified during step 118. To do this, the intermediate representation obtained in step 104 is consulted in order to identify the position, and in particular the start and the end, of the instruction in question (or of the instructions or also of the block of instructions). It is then replaced with its variant in the language used to code the source program. This step 120 therefore provides an optimized source program.

An example of an optimized program 212 for the source program 200 of FIG. 1, and in particular for the function "polynome( )" is given in FIG. 2g. It is noted that the lines of code the function of which was to calculate the variable "var float calcul", namely the following lines of code:
  calcul=v×v; // calcul du polynome $x^2$
  calcul=calcul+v; // calcul du polynome $x^2$+x
have been replaced with their optimized variant, namely with the following line of code:
  calcul=v×(v+1.0);

During an optional step 122, the method 100 makes it possible to confirm that the optimized source program provides more accurate results. To do this, the optimized source program is instrumented in initial accuracy, in a similar or identical manner to step 106, then executed. The measured values are compared with those obtained during step 110, using the source program, in initial accuracy and in infinite accuracy.

Figure 3:
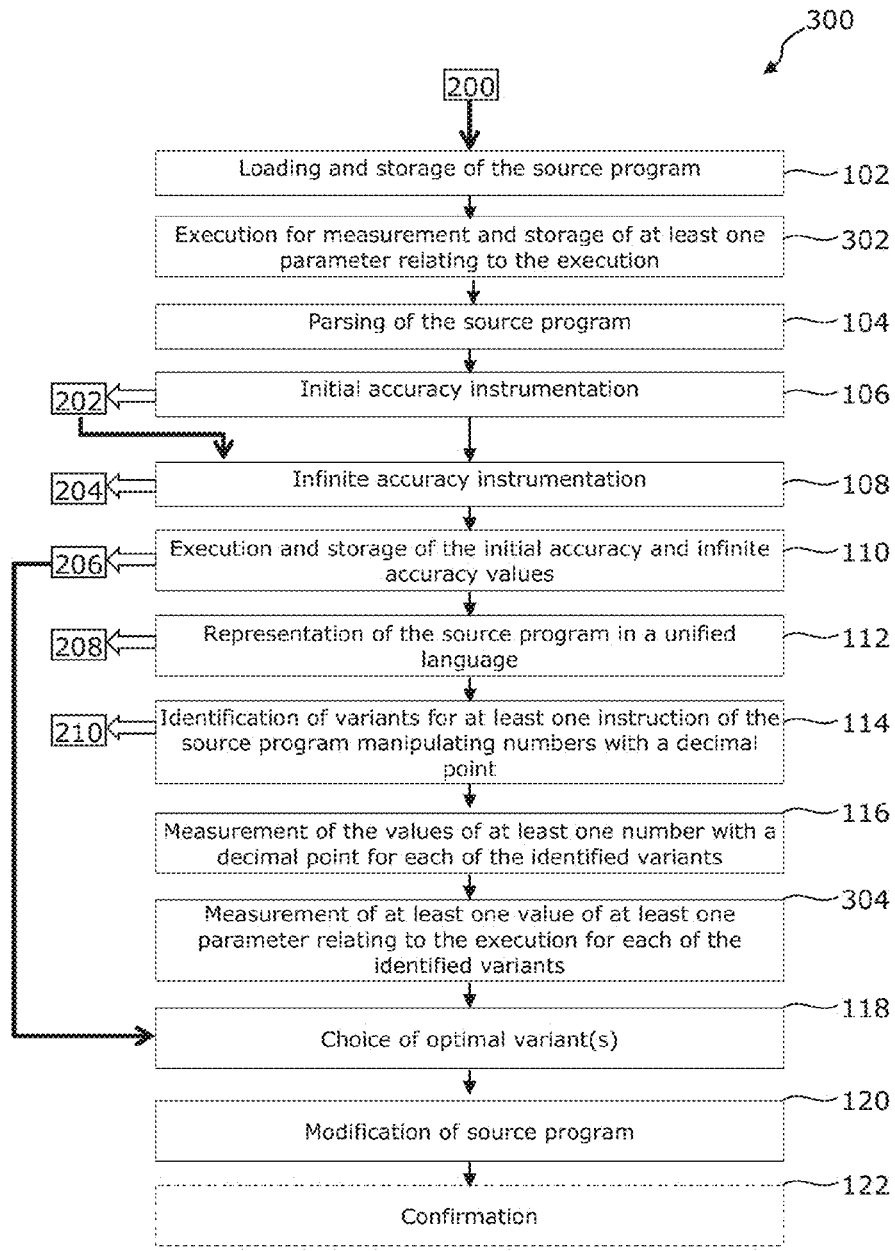
FIG. 3 is a diagrammatic representation in the form of a diagram of the steps of a second non-limitative example of a method according to the invention.

FIG. 3 is a diagrammatic representation in the form of a diagram of the steps of a second non-limitative example of a method according to the invention.

The method 300 shown in FIG. 3 comprises all the steps of the method 100 shown in FIG. 1.

In addition, the method 300 comprises, after step 102, a step 302 carrying out an execution of the loaded source program to measure and store the value, called initial value, of at least one parameter relating to the execution of the source program, namely for example:
- a total execution time,
- an amount of resources needed for the execution,
- etc.

In addition, the method 300 comprises, after step 116, a step 304, producing, for each variant, the value of the parameter or parameters relating to the execution.

Thus, in the method 300, during step 118, the choice of the optimized variant is made:
- as a function of the accuracy on the one hand and,
- on the other hand, as a function of at least one measured value for at least one parameter relating to the execution of the program, such as for example:
  - an execution time of the program, or
  - a total quantity of resources needed to execute the program.

Thus, it is possible for example to choose, for at least one instruction, a variant which provides the same accuracy as the initial instruction but which makes it possible to reduce the total execution time of the program and/or the resources needed for the execution of the program.

More generally, the method 300 shown in FIG. 3 makes it possible to adjust the accuracy of the computer program as a function of at least one other execution parameter of the program.

Figure 4:
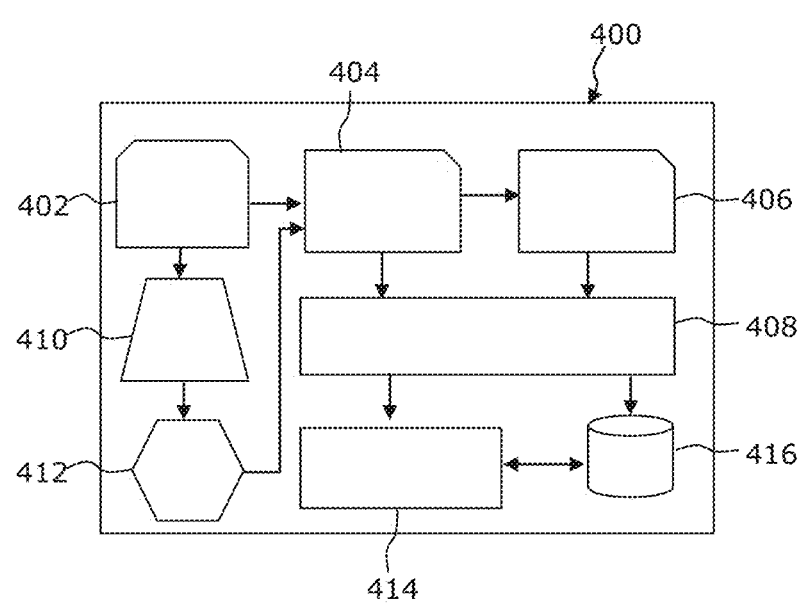
FIG. 4 is a diagrammatic representation of a non-limitative example of a system according to the invention.

FIG. 4 is a diagrammatic representation of a non-limitative example of a system according to the invention.

The system 400 shown in FIG. 4 comprises a set of modules arranged or configured to implement the method according to the invention, such as for example the methods 100 or 300 described above.

The system 400 comprises:
- a module 402, said parser, for providing, by parsing of a source program, an intermediate representation of this source program,
- a module 404, said instrumentation module, for inserting into a source program instrumentation instructions for measuring and providing at least one value of at least one number with a decimal point manipulated by/in the source program;
- a module 406, said infinite accuracy module, making it possible to modify at least one format (or one type) of at least one number or of an operation of the source program,
- a module 408 for executing a computer program for providing:
  - a value of at least one parameter relating to the execution of the program, such as for example the execution time, and/or
  - a value of at least one previously instrumented program;
- a module 410, said conversion module, making it possible to convert the source program into a unified language, such as for example the language used in FIG. 2f;
- a module 412, said enhancement module, configured to enhance the source program with at least one variant of at least one instruction and/or of at least one block of instructions; and
- a module 414 configured to manage the other modules and to choose at least one variant of at least one instruction, or of a block of instructions as a function of the values provided by the other modules, and in particular by the module 408.

The system 400 can also comprise one or more storage means 416 for storing one or some values measured by the other modules, and in particular by the module 408.

Although shown separately in FIG. 4, several modules, and in particular all the modules, can be integrated in a single module.

The system 400 can be a computer, a processor, an electronic chip or any other means that can be configured physically or by software to carry out the steps of the method according to the invention.

Of course, the invention is not limited to the examples that have just been described.

The invention claimed is:

1. A method for adjusting the accuracy provided by a computer program using a source program, the source program configured for manipulating at least one number with a decimal point, the method comprising the following steps:
   determining, with an initial precision measurement, at least one value of at least one number with a decimal point in the source program;
   determining, with an infinite precision measurement, at least one value of said at least one number with a decimal point in the source program, said infinite precision being obtained by replacing, prior to said measurement, a format of said at least one number with a decimal point or of a primitive operation manipulating at least one number with a decimal point with a predetermined more precise format, called an optimal format;
   for at least one instruction, manipulating, in the source program, at least one number with a decimal point, replacing said at least one instruction by a variant of said instruction, said replacing step comprising:
   writing at least one variant performing the same function as said at least one instruction;
   measuring, for each variant, at least one value of said at least one number with a decimal point obtained with said variant; and
   selecting at least one variant, said optimal variant, as a function of said measured value and said initial precision and infinite precision values previously measured; and
   modifying the source program by replacing said instruction with said selected optimal variant to reduce the resources and time needed for execution of the computer program for a given accuracy.

2. The method according to claim 1, further comprising a step of parsing the source program by providing a representation, which is an intermediate representation, of the source program, wherein at least one of the subsequent steps is carried out as a function of said intermediate representation.

3. The method according to claim 1, further comprising, before the writing step, a representation of the source program in a unified language irrespective of the language used for the source program, wherein the optimization step is carried out on the source program in said unified language.

4. The method according to claim 1, wherein, for at least one instruction, the modification step comprises:
   identifying said at least one instruction in the source program, coding the optimal variant of said at least one instruction in the language of the source program, and replacing said at least one instruction with its optimal variant in the source program.

5. The method according to claim 1, wherein at least one variant of at least one instruction manipulating a number with a decimal point is written as a function of at least one infinite precision value of said number, previously measured during the infinite precision measurement step.

6. The method according to claim 1, wherein the selection of an optimal variant is also carried out as a function of at least one other previously defined parameter which is a parameter relating to an execution time of the program or a parameter relating to a resource needed for the execution of the source program.

7. The method according to claim 1, wherein at least one instruction for which at least one variant is written during the writing step comprises:
   a mathematical operation, or a relationship comprising several mathematical operations, implemented in the source program;
   a functional block formed by several instructions;
   a conditional block formed by several instructions;
   an iterative block formed by several instructions;
   a function call; and
   a definition of a variable or a function.

8. The method according to claim 1, wherein the writing step comprises an enhancement of the program with one or more variants of one or more instructions.

9. The method according to claim 1, wherein the step of measuring the value of a number obtained with a variant of an instruction comprises the following operations:
   running through the program with said variant, optionally combined with each of the variants of each of the other instructions; and
   propagating the error obtained with said variant, as the source program progresses, for each combination.

10. The method according to claim 9, wherein, for at least one combination, the propagation of the error is carried out using the optimal format.

11. The method according to claim 1, wherein the initial precision measurement step and the infinite precision measurement step of a value of a number comprises adding into the program at least one instruction called the instrumentation instruction, providing said value.

12. The method according to claim 1, wherein:
   the optimal format for at least one variable is a Multiple Precision Floating-Point (MPFR) format or the rational number format, such that at least one variable with the primitive format is redefined with the MPFR format or with the rational number format; and
   the optimal format for an operation is the MPFR format, such that at least one mathematical operation with the primitive format is redefined by a function call with the MPFR format.

13. The method according to claim 1, wherein the step of modification of the source program provides an optimized program, the method also comprising a step of verification of the optimization, comprising:
   initial precision measurement of at least one value of at least one number with a decimal point in said optimized source program; and
   comparison of said measured value with a value of said number with a decimal point measured in initial precision for the source program.

14. A method for adjusting the accuracy provided by a computer program using a source program, the source program configured for manipulating at least one number with a decimal point, the method comprising:
   loading and storage of the source program;
   parsing of the source program to provide an intermediate representation of the source program;
   determining an initial precision measurement of at least one value of at least one number with a decimal point in the source program;
   determining an infinite precision measurement of at least one value of said at least one number with a decimal point in the source program, in which a format of said at least one number with a decimal point or of a primitive operation manipulating at least one number with a decimal point is replaced with a predetermined more precise format called an optimal format;
   executing and storing the initial precision values and the infinite precision values;
   representing the source program in a unified language;
   for at least one instruction, manipulating in the source program, at least one number with a decimal point, replacing said instruction with a variant, said replacing step comprising:
      writing at least one variant performing the same function as said at least one instruction;
      measuring, for each variant, at least one value of said at least one number with a decimal point obtained with said variant; and
      selecting at least one variant, said optimal variant, as a function of said measured value and said initial precision and infinite precision values; and
   modifying the source program by replacing said at least one instruction with said selected optimal variant to reduce the resources and time needed for execution of the computer program for a given accuracy.

* * * * *